US012451146B2

(12) United States Patent
Yoshino et al.

(10) Patent No.: US 12,451,146 B2
(45) Date of Patent: Oct. 21, 2025

(54) INFORMATION PROCESSING DEVICE AND INFORMATION PROCESSING METHOD

(71) Applicant: SONY GROUP CORPORATION, Tokyo (JP)

(72) Inventors: Masaharu Yoshino, Tokyo (JP); Satoru Osugi, Tokyo (JP); Shota Hashimoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 57 days.

(21) Appl. No.: 18/262,838

(22) PCT Filed: Jan. 13, 2022

(86) PCT No.: PCT/JP2022/000919
§ 371 (c)(1),
(2) Date: Jul. 25, 2023

(87) PCT Pub. No.: WO2022/168559
PCT Pub. Date: Aug. 11, 2022

(65) Prior Publication Data

US 2024/0096333 A1 Mar. 21, 2024

(30) Foreign Application Priority Data

Feb. 3, 2021 (JP) ................................ 2021-015786

(51) Int. Cl.
*G10L 19/005* (2013.01)
*G10L 19/00* (2013.01)

(52) U.S. Cl.
CPC ...... *G10L 19/005* (2013.01); *G10L 2019/001* (2013.01)

(58) Field of Classification Search
CPC ..... G10L 19/005; G10L 19/028; G10L 19/06; G10L 19/09; G10L 2019/0002; G10L 19/012; G10L 19/0212; G10L 2019/0016
(Continued)

(56) References Cited

U.S. PATENT DOCUMENTS 5,475,712 A * 12/1995 Sasaki .................. G10L 19/012 704/223
2009/0171656 A1 * 7/2009 Kapilow ............... G10L 19/005 704/207

(Continued)

FOREIGN PATENT DOCUMENTS

JP 10-135935 A 5/1998
JP 2000-243065 A 9/2000

(Continued)

OTHER PUBLICATIONS

International Search Report and Written Opinion of PCT Application No. PCT/JP2022/000919, issued on Apr. 5, 2022, 12 pages of ISRWO.

*Primary Examiner* — Vijay B Chawan
(74) *Attorney, Agent, or Firm* — CHIP LAW GROUP

(57) ABSTRACT

Provided is an information processing device that includes a detection unit and a control execution unit. The detection unit detects discontinuous points where a signal level of an input signal is discontinuous. The control execution unit performs predetermined control on a loss section that is a section between a first discontinuous point and a second discontinuous point detected by the detection unit. The predetermined control has a control start position at a point in time before the first discontinuous point by a first period and a control end position at a point in time after the second discontinuous point by a second period.

13 Claims, 9 Drawing Sheets

(58) Field of Classification Search
USPC .......................................................... 704/219
See application file for complete search history.

(56) References Cited

U.S. PATENT DOCUMENTS

| | | | | |
|---|---|---|---|---|
| 2011/0191111 | A1* | 8/2011 | Chu | G10L 19/005 704/500 |
| 2012/0063773 | A1 | 3/2012 | Sluz | |
| 2013/0246068 | A1* | 9/2013 | Lee | G10L 19/09 704/265 |
| 2017/0004833 | A1* | 1/2017 | Schnabel | G10L 19/028 |
| 2022/0166980 | A1* | 5/2022 | Morigami | H04N 19/129 |

FOREIGN PATENT DOCUMENTS

| | | | | | |
|---|---|---|---|---|---|
| JP | 2001176215 | A | * | 6/2001 | G10L 19/0212 |
| JP | 2004-064390 | A | | 2/2004 | |
| JP | 2004297802 | A | | 10/2004 | |
| JP | 2005151235 | A | * | 6/2005 | G10L 19/0212 |
| JP | 2006042210 | A | * | 2/2006 | G10L 2019/001 |
| JP | 2006-135872 | A | | 5/2006 | |
| JP | 2010282699 | A | * | 12/2010 | G10L 21/0232 |
| JP | 2012199732 | A | | 10/2012 | |
| JP | 2017-513072 | A | | 5/2017 | |
| WO | WO-2010100895 | A1 | | 9/2010 | |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/000919 filed on Jan. 13, 2022, which claims priority benefit of Japanese Patent Application No. JP 2021-015786 filed in the Japan Patent Office on Feb. 3, 2021. Each of the above-referenced applications is hereby incorporated herein by reference in its entirety.

FIELD

The present disclosure relates to an information processing device, an information processing method, and an information processing program.

BACKGROUND

For example, there is a device that reproduces audio data acquired from the outside such as a headphone or a TWS (True Wireless Stereo) earphone. In such a device, when discontinuous points having different audio levels are present in the audio data to be reproduced, the discontinuous points become noise and reproduction quality is deteriorated, for example, harsh sound is output.

For example, when continuous audio data is generated by connecting discontinuous audio data, for example, cutting out data in a certain section and connecting the data to data in another section, discontinuous points sometimes occur in a connecting portion of the data. Under such circumstances, there is known a technique for suppressing deterioration in reproduction quality at discontinuous points by performing fade processing to audio data near the discontinuous points.

CITATION LIST

Patent Literature

Patent Literature 1: JP 2000-243065 A

SUMMARY

Technical Problem

However, in the related art described above, a case in which a silent period is included in continuous audio data such as a case in which a part of audio data is lost during transmission is not considered. For example, due to a communication environment or the like at the time when audio data is acquired from the outside, in some case not all of the data are acquired and a part of the audio data is lost. Discontinuity points occur at both end portions of the silent section in which the audio data is lost.

Therefore, the present disclosure proposes an information processing device, an information processing method, and an information processing program capable of suppressing deterioration in reproduction quality due to a data loss during transmission.

Solution to Problem

According to the present disclosure, an information processing device includes a detection unit and a control execution unit. The detection unit detects discontinuous points where a signal level of an input signal is discontinuous. The control execution unit performs predetermined control on a loss section that is a section between a first discontinuous point and a second discontinuous point detected by the detection unit. The predetermined control has a control start position at a point in time before the first discontinuous point by a first period and a control end position at a point in time after the second discontinuous point by a second period.

DESCRIPTION OF EMBODIMENTS

Figure 1:
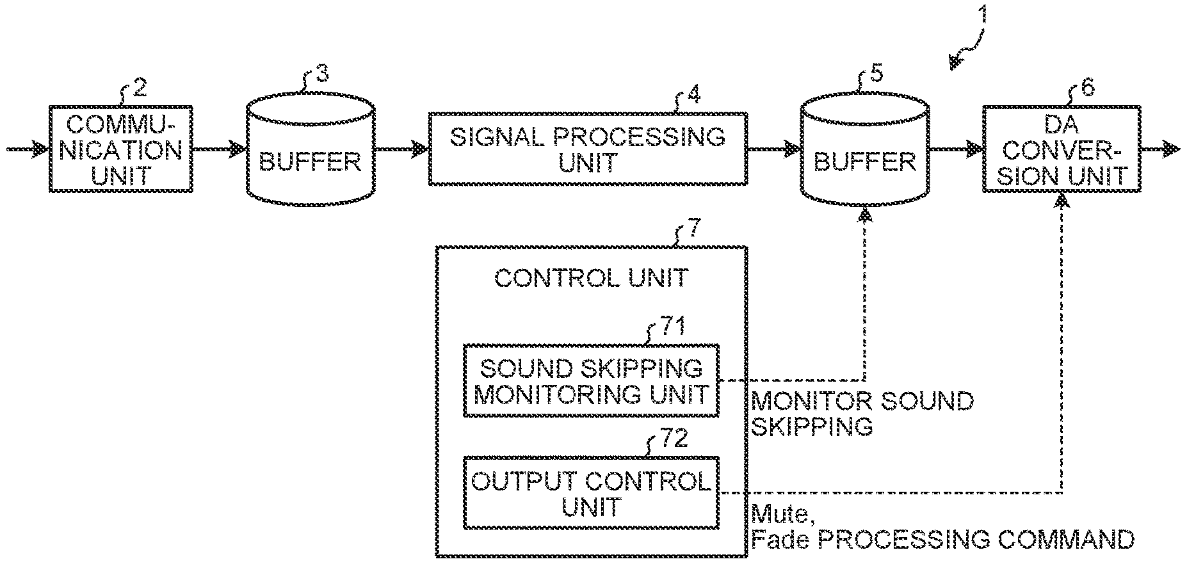
FIG. 1 is a diagram illustrating a configuration example of an information processing device according to a first embodiment of the present disclosure.

Embodiments of the present disclosure are explained in detail below with reference to the drawings. Note that, in the embodiment explained below, redundant explanation is omitted by denoting the same parts with the same reference numerals and signs.

The present disclosure is explained according to order of items described below.

1. First Embodiment 1-1. Configuration of an information processing device according to a first embodiment 1-2. Overview of processing according to the first embodiment
1-3. Procedure of the processing according to the first embodiment
2. Second Embodiment
2-1. Overview of processing according to a second embodiment
2-2. Procedure of the processing according to the second embodiment
3. Third Embodiment
3-1. Overview of processing according to a third embodiment
3-2. Procedure of the processing according to the third embodiment
4. Fourth Embodiment
4-1. Configuration of an information processing device according to a fourth embodiment
4-2. Overview of processing according to the fourth embodiment
4-3. Procedure of the processing according to the fourth embodiment
4-4. Modifications of the fourth embodiment
5. Fifth Embodiment
5-1. Configuration of an information processing device according to a fifth embodiment
5-2. Overview of processing according to the fifth embodiment
5-3. Procedure of the processing according to the fifth embodiment
6. Sixth Embodiment
6-1. Overview of processing according to a sixth embodiment
6-2. Procedure of the processing according to the sixth embodiment
7. Other embodiments
8. Effects by an information processing device according to the present disclosure

1. First Embodiment

[1-1. Configuration of an Information Processing Device According to a First Embodiment]

A configuration example of an information processing device 1 according to a first embodiment is explained with reference to FIG. 1. FIG. 1 is a diagram illustrating the configuration example of the information processing device 1 according to the first embodiment of the present disclosure.

The information processing device 1 is an apparatus that reproduces audio data acquired from an external device such as a headphone or a TWS (True Wireless Stereo) earphone. Here, the TWS earphone is an earphone in which left and right earphones are connected in various wireless communication schemes. The information processing device 1 acquires audio data from an external device by, for example, wireless communication. Here, as wireless transmission, various communication standards such as Bluetooth (registered trademark), BLE (Bluetooth (registered trademark) Low Energy), Wi-Fi (registered trademark), 3G, 4G, and 5G can be used as appropriate.

Here, the external device is, for example, a device that wirelessly transmits various data such as audio data of music or a moving image. As the external device, devices such as a smartphone, a tablet terminal, a personal computer (PC), a cellular phone, and a personal digital assistant (PDA) can be used as appropriate. The external device performs signal processing such as encoding processing and modulation processing to the audio data and transmits the processed audio data to the information processing device 1. The audio data is transmitted from the external device to the information processing device 1 for each frame (packet) including a predetermined number of samples.

Note that the information processing device 1 may acquire the audio data from the external device by wired communication. Furthermore, the information processing device 1 may be configured integrally with the external device.

As illustrated in FIG. 1, the information processing device 1 according to the embodiment includes a communication unit 2, a buffer 3, a signal processing unit 4, a buffer 5, a DA conversion unit 6, and a control unit 7.

The communication unit 2 performs wireless communication with the external device and receives audio data from the external device. The communication unit 2 outputs the received audio data to the buffer 3. The communication unit 2 includes, as a hardware configuration, a communication circuit adapted to a communication standard of wireless transmission corresponding to the hardware. As an example, the communication unit 2 includes a communication circuit adapted to the Bluetooth standard.

The buffer 3 is a buffer memory that temporarily stores audio data output from the communication unit 2.

The signal processing unit 4 demodulates (decodes), for each frame including a predetermined number of samples, the audio data temporarily stored in the buffer 3. The signal processing unit 4 decodes encoded data (audio data) in units of frames using a predetermined decoder. The signal processing unit 4 outputs the decoded audio data in units of frames to the buffer 5. The signal processing unit 4 includes, as hardware components, a processor such as a DSP (Digital Signal Processor) and memories such as a RAM (Random Access Memory) and a ROM (Read Only Memory). The processor loads a program stored in the ROM to the RAM and executes the loaded program (application) to thereby implement functions of the signal processing unit 4.

Note that the signal processing unit 4 may include, as hardware components, a processor such as a CPU (Central Processing Unit), a MPU (Micro-Processing Unit), a PLD (Programmable Logic Device) such as an FPGA (Field Programmable Gate Array), or an ASIC (Application Specific Integrated Circuit) instead of the DSP or in addition to the DSP.

The buffer 5 is a buffer memory that temporarily stores audio data in units of frames output from the signal processing unit 4.

The DA conversion unit 6 is a circuit that converts the audio data (digital signal) temporarily stored in the buffer 5 into an analog signal and supplies the converted analog signal to an output device such as a speaker. The DA conversion unit 6 includes a circuit that changes, according to control of the control unit 7, the amplitude (a signal level) of the analog signal to be supplied to the output device such as the speaker. Here, the change of the amplitude of the analog signal includes at least mute processing and fade processing of the analog signal (the audio signal). The fade processing includes fade-in processing and fade-out processing.

The control unit 7 controls operations of the information processing device 1 such as the communication unit 2, the signal processing unit 4, and the DA conversion unit 6. The control unit 7 includes a processor such as a CPU and memories such as a RAM and a ROM as hardware components. The processor loads a program stored in the ROM to the RAM and executes the loaded program (application) to thereby implement functions (a sound skipping monitoring unit 71 and an output control unit 72) included the control unit 7.

The sound skipping monitoring unit 71 refers to the audio data in frame units stored in the buffer 5 and performs sound skipping detection processing for monitoring presence or absence of sound skipping due to a loss (a packet loss) of the audio data. Here, the sound skipping monitoring unit 71 is an example of a detection unit.

The output control unit 72 performs output control processing for changing, with the DA conversion unit 6, a signal level of the output signal (the analog signal) according to detection of sound skipping by the sound skipping monitoring unit 71. The output control processing includes fade-out processing, fade-in processing, and mute processing. Here, the fade-out processing is processing for gradually dropping the signal level of the output signal from the DA conversion unit 6. The fade-in processing is processing for gradually raising the signal level of the output signal from the DA conversion unit 6. The mute processing is processing for reducing the signal level of the output signal from the DA conversion unit 6 to zero. Here, the output control unit 72 is an example of a control execution unit. The output control processing is not limited to the fade-out processing, the fade-in processing, and the mute processing. The output control processing may be, for example, processing for gradually fading out a sound volume and, after the sound volume reaches a certain sound volume which is not zero, maintaining the sound volume.

Note that the control unit 7 may include, as a hardware component, a processor such as a PLD such as an MPU, a DSP, or an FPGA or an ASIC instead of or in addition to the CPU.

Note that at least two of the buffer 3, the buffer 5, the memory of the signal processing unit 4, and the memory of the control unit 7 may be integrally configured. Each of the buffer 3, the buffer 5, the memory of the signal processing unit 4, and the memory of the control unit 7 may be constituted by two or more memories.

Note that the processor of the signal processing unit 4 and the processor of the control unit 7 may be integrally configured. Each of the processor of the signal processing unit 4 and the processor of the control unit 7 may be configured by two or more processors.

[1-2. Overview of Processing According to the First Embodiment]

In the information processing device 1 such as a headphone or a TWS earphone that reproduces audio data acquired from an external device, it is required to suppress a main body size from the viewpoint of improvement of portability reduction in a burden on a user by reduction in weight and reduction in size. Therefore, such an information processing device 1 has many restrictions such as the size and the number of loaded circuit components such as the CPU, power consumption, and antenna performance.

Therefore, there has been a case in which a part of audio data is lost because of a communication environment at the time when the audio data is acquired from the external device, processing speed of the audio data in the information processing device 1, and the like. For example, when the information processing device 1 is configured as mobile equipment and audio data is acquired from the external device by wireless voice transmission, the communication environment is sometimes suddenly deteriorated. Because of processing speed relating to the transmission of the audio data in the external device, a loss sometimes occurs in a part of the audio data acquired by the information processing device 1. For example, the processing speed relating to the transmission of the audio data can drop when a read error occurs in the audio data scheduled to be transmitted in the external device or because of a delay in signal processing such as encoding processing or modulation processing.

Under such circumstances, discontinuity points occur at both end portions of a silent section in which the audio data is lost. When discontinuous points having different audio levels are present in audio data to be reproduced, the discontinuous points become noise and reproduction quality is deteriorated, for example, harsh sound is output.

Therefore, the present disclosure proposes the information processing device 1 capable of suppressing deterioration in reproduction quality due to a data loss during transmission.

Figure 2:
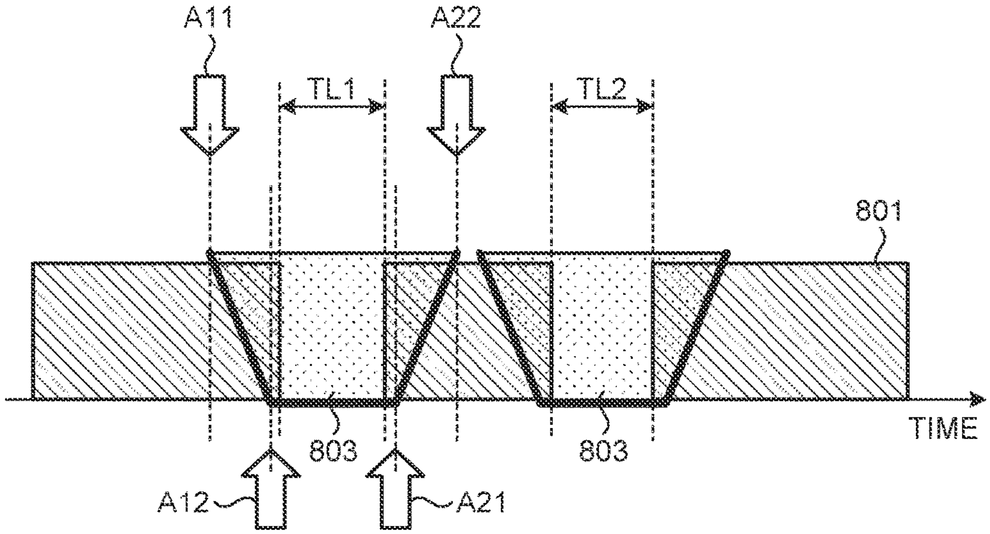
FIG. 2 is a diagram illustrating an overview of processing according to the first embodiment of the present disclosure.

FIG. 2 is a diagram illustrating an overview of processing according to the first embodiment of the present disclosure. In an example illustrated in FIG. 2, the horizontal axis indicates time. Furthermore, regions hatched by right downward oblique lines indicate sections in which no loss occurs in an input signal 801 (audio data) to the information processing device 1. On the other hand, regions not hatched by right downward oblique lines (loss sections TL1 and TL2) respectively indicate sections in which a loss occurs in the input signal 801 to the information processing device 1. Here, the height of the region hatched by the right downward oblique lines schematically indicates a signal level of the input signal to the information processing device 1. That is, both end portions of the loss sections TL1 and TL2 are discontinuous points where the signal level of the input signal is discontinuous. In other words, the loss sections TL1 and TL2 are sections between two discontinuous points. Furthermore, regions hatched by dots schematically indicate output control 803 according to the embodiment.

When the sound skipping monitoring unit 71 detects the loss section TL1, that is, sound skipping, the output control unit 72 performs the output control 803 (predetermined control) for changing the signal level of the output signal with respect to the discontinuous points at both end portions of the loss section TL1. Specifically, as illustrated in FIG. 2, the output control unit 72 sets a control start position A11 at a point in time a predetermined period (a first period) before a start position of the loss section TL1. As illustrated in FIG. 2, the output control unit 72 sets a control end position A22 at a point in time a predetermined period (a second period) after an end position of the loss section TL1. As illustrated in FIG. 2, the output control unit 72 performs the output control 803 between the control start position A11 and the control end position A22.

More specifically, as illustrated in FIG. 2, the output control unit 72 performs, with the DA conversion unit 6, fade-out processing from the control start position A11 to an end position A12 of the fade-out processing. The output control unit 72 preferably sets the control start position A11 such that the end position A12 of the fade-out processing is at the start position of the loss section TL1 or a point in time earlier than the start position. In other words, a section from the control start position A11 to the end position A12 of the fade-out processing is preferably the first period or shorter. Note that the fade-out processing may end later than the start position of the loss section TL1.

In addition, as illustrated in FIG. 2, the output control unit 72 performs, with the DA conversion unit 6, fade-in processing from a start position A21 of the fade-in processing to a control end position A22. The output control unit 72 preferably sets the control end position A22 such that the start position A21 of the fade-in processing is at the end position of the loss section TL1 or a point in time later than the end position. In other words, a section from the start position A21 of the fade-in processing to the control end position A22 is preferably the second period or shorter. The fade-in processing may be started earlier than the end position of the loss section TL1.

As illustrated in FIG. 2, the output control unit 72 performs, with the DA conversion unit 6, mute processing from the end position A12 of the fade-out processing to the start position A21 of the fade-in processing.

As explained above, the output control unit 72 sets the first period (the control start position A11) according to the signal level of the input signal and dropping speed of the signal level in the fade-out processing (the inclination of the left end of the output control 803 in FIG. 2). The output control unit 72 sets the second period (the control end position A22) according to the signal level of the input signal and rising speed of the signal level in the fade-in processing (the inclination of the right end of the output control 803 in FIG. 2).

Note that the output control 803 for the loss section TL1 is explained above with reference to FIG. 2. The output control unit 72 performs the output control 803 for the loss section TL2 in the same manner.

It is assumed that the dropping speed of the signal level in the fade-out processing and the rising speed of the signal level in the fade-in processing are, for example, determined in advance and stored in, for example, the memory of the control unit 7. In addition, FIG. 2 illustrates a case in which the changing speeds of the signal level are respectively constant. However, the changing speeds are not limited to this. The changing speeds of the signal level may change in at least one of the fade-out processing and the fade-in processing. The changing speeds of the signal level may be set as appropriate by the user.

[1-3. Procedure of the Processing According to the First Embodiment]

Figure 3:
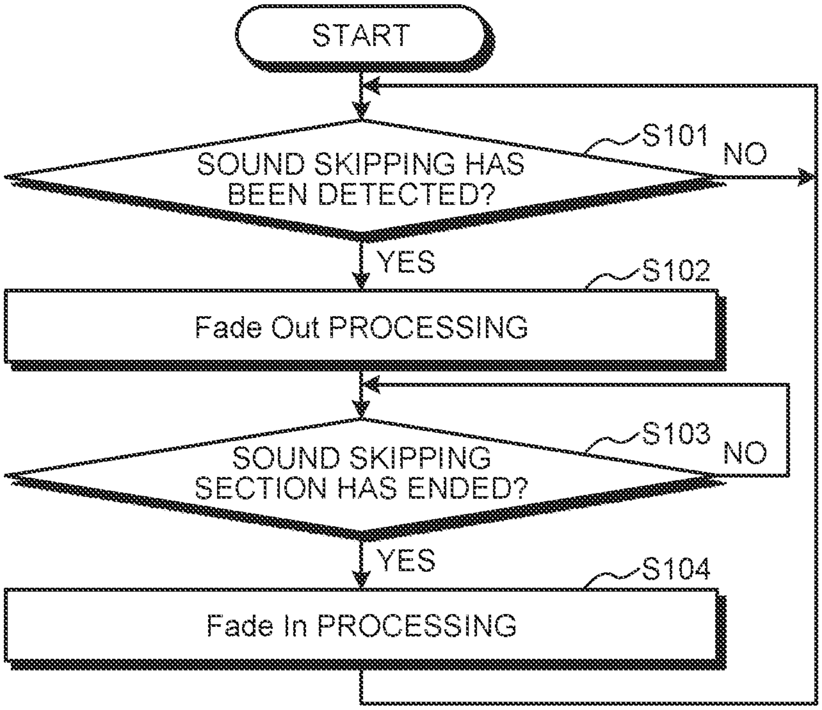
FIG. 3 is a flowchart illustrating an example of the processing according to the first embodiment of the present disclosure.

Subsequently, a procedure of processing according to the embodiment is explained with reference to FIG. 3. FIG. 3 is a flowchart illustrating an example of processing according to the first embodiment of the present disclosure. A flow illustrated in FIG. 3 is started, for example, when audio data is received from an external device. The flow illustrated in FIG. 3 ends, for example, when reproduction of the audio data received from the external device ends or when the information processing device 1 is turned off.

First, the sound skipping monitoring unit 71 determines whether sound skipping has been detected (S101). When determining that sound skipping has not been detected (S101: No), the sound skipping monitoring unit 71 repeats the processing in S101.

On the other hand, when it is determined that sound skipping has been detected (S101: Yes), the output control unit 72 performs fade-out processing on discontinuous points in a start position of a loss section (a sound skipping section) in which the sound skipping has been detected (S102). After the fade-out processing ends, the output control unit 72 performs mute processing on the sound skipping section.

Thereafter, the output control unit 72 determines whether the sound skipping is detected, that is, whether the sound skipping section (the loss section) has ended (S103). Note that the sound skipping section is in units of packets (frames). Therefore, the length of the sound skipping section can be calculated in advance according to, for example, a wireless transmission scheme of audio data or a codec. Therefore, in this determination, whether sound skipping is detected may be determined as in the processing in S101 or may be determined based on whether the calculated length has elapsed from the start position of the sound skipping section. When it is not determined that the sound skipping section has ended (S103: No), the output control unit 72 continues the mute processing for the sound skipping section.

On the other hand, when it is determined that the sound skipping section has ended (S103: Yes), the output control unit 72 performs fade-in processing on the discontinuous points in an end position of the sound skipping section. Thereafter, the flow illustrated in FIG. 3 returns to the processing in S101.

As explained above, the information processing device 1 according to the first embodiment performs the output control processing for changing the signal level for the discontinuous points at both the end portions of the sound skipping section (the silent section) when it is determined that sound skipping has been detected. Consequently, it is possible to change harsh sound skipping at the discontinuous points due to the loss of the audio data to mild sound skipping with improved listening comfort. In other words, with the information processing device 1 according to the first embodiment, it is possible to suppress deterioration in reproduction quality due to a data loss during transmission.

2. Second Embodiment

In the first embodiment, the information processing device 1 is illustrated that performs, for each of the sound skipping sections (the loss sections TL1 and TL2), the fade processing (the output control processing) on the discontinuous points at both the end portions of the sound skipping sections. However, the present disclosure is not limited to this. The information processing device 1 can also perform a series of output control processing on sound skipping sections that continuously occur.

Note that the information processing device 1 according to the second embodiment has a configuration similar to the configuration of the information processing device 1 according to the first embodiment explained with reference to FIG. 1.

[2-1. Overview of Processing According to the Second Embodiment]

Figure 4:
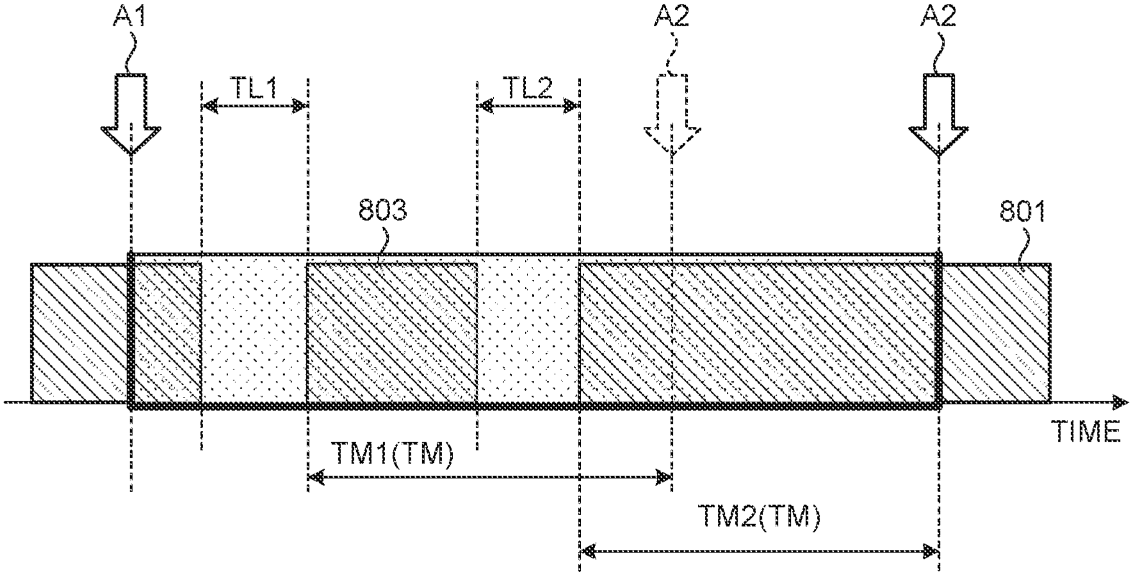
FIG. 4 is a diagram illustrating an overview of processing according to a second embodiment of the present disclosure.

FIG. 4 is a diagram illustrating an overview of processing according to the second embodiment of the present disclosure.

As illustrated in FIG. 4, as in the first embodiment, the output control unit 72 sets the control start position A1 at a point in time a predetermined period (a first period) before the start position of the loss section TL1. That is, when the loss section TL1 is detected, the output control unit 72 sets the control start position A1 based on the detected start position of the loss section TL1.

As illustrated in FIG. 4, the output control unit 72 according to the second embodiment performs a series of output control 803 on the loss section TL1 and the loss section TL2 detected in a predetermined period (a mute section TM) from the end position of the loss section TL1. Here, it is assumed that the mute section TM is determined in advance and stored in, for example, the memory of the control unit 7. As an example, a time width of the mute section TM is 200 ms. Here, the mute section TM may be set to a desired period based on, for example, a type of a codec and a sampling rate.

First, as indicated by a broken line arrow in FIG. 4, the output control unit 72 sets the control end position A2 at a time point after the end position of the loss section TL1 by a mute section TM1 (a second period).

For example, as illustrated in FIG. 4, it is assumed that the loss section TL2 is detected until the mute section TM1 (the mute section TM) elapses from the end position of the loss section TL1. At this time, the output control unit 72 sets a mute section TM2 (the mute section TM) from an end position of the loss section TL2. In other words, when a loss section is detected in the mute section TM, the output control unit 72 resets the mute section TM with an end position of the detected loss section as a start point. That is, as indicated by a solid line arrow in FIG. 4, the output control unit 72 resets the control end position A2 at a point in time after the end position of the loss section TL2 by the mute section TM2 (the second period).

For example, unlike an example illustrated in FIG. 4, unless the loss section TL2 is detected until the mute section TM1 (the mute section TM) elapses from the end position of the loss section TL1, the output control unit 72 sets the control end position A2 at a point in time after the end position of the loss section TL1 by the mute section TM1 (the second period).

Note that a case is illustrated in which the mute sections TM1 and TM2 (the mute sections TM) are started from the end positions of the loss sections TL1 and TL2. However, the mute sections TM1 and TM2 are not limited to this. The mute sections TM1 and TM2 may be started from the start positions of the loss sections TL1 and TL2. As explained above, when the loss section TL1 is detected, the output control unit 72 can also use the start position of the detected loss section TL1 as reference timing relating to various kinds of output control.

Note that, when the loss section TL2 falls within a period from the end position of the loss section TL1 until the mute section TM1 (the mute section TM) elapses, as in the first embodiment, the output control unit 72 may set the control end position A2 at a point in time after a predetermined period (the second period) from the end position of the loss section TL1, that is, a point in time after the mute section TM1.

As explained above, the output control unit 72 performs a series of output control 803 (predetermined control) on the continuous loss sections TL1 and TL2 between the control start position A1 and the control end position A2.

Note that the output control 803 according to the second embodiment does not include fade processing. Therefore, the first period and the second period according to the second embodiment can be respectively set shorter than the first period and the second period according to the first embodiment.

More specifically, as illustrated in FIG. 4, the output control unit 72 performs, with the DA conversion unit 6, mute processing (the output control 803) in the control start position A1. The output control unit 72 performs, with the DA conversion unit 6, unmute processing (the output control 803) in the control end position A2. Note that, as illustrated in FIG. 4, when the loss section TL2 is detected in the mute section TM1, the output control unit 72 does not perform the unmute processing on the end position of the loss section TL1. Similarly, when the loss section TL2 is detected in the mute section TM, the output control unit 72 does not perform the unmute processing on the start position of the loss section TL2.

[2-2. Procedure of the Processing According to the Second Embodiment]

Figure 5:
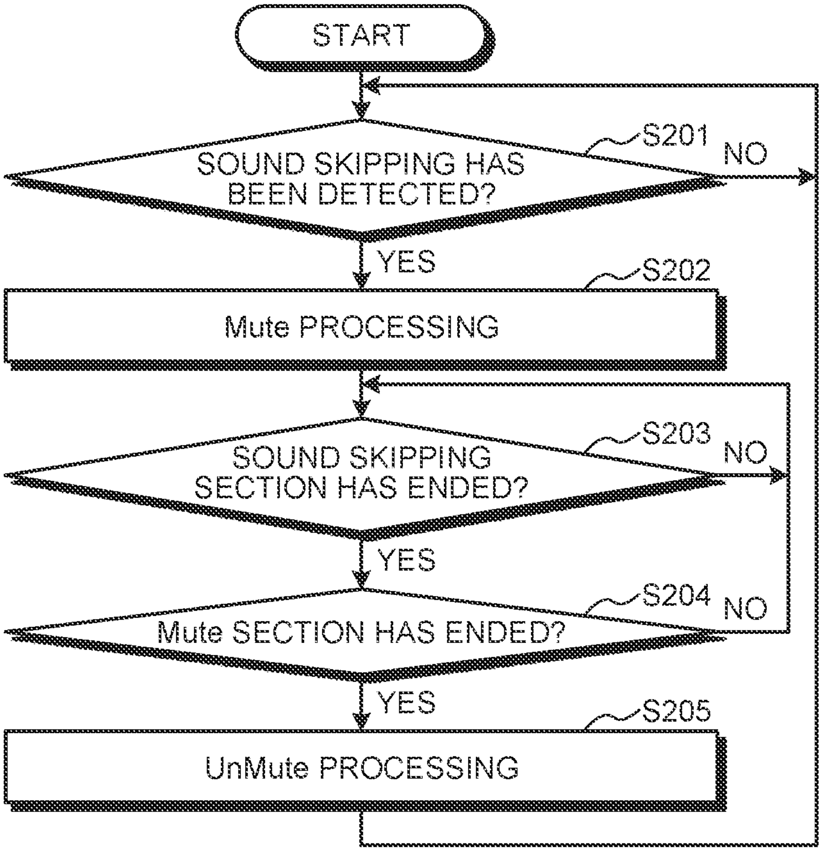
FIG. 5 is a flowchart illustrating an example of the processing according to the second embodiment of the present disclosure.

Subsequently, a procedure of the processing according to the embodiment is explained with reference to FIG. 5. FIG. 5 is a flowchart illustrating an example of the processing according to the second embodiment of the present disclosure. Note that, here, differences from the flow of the processing according to the first embodiment in FIG. 3 are mainly explained.

First, the sound skipping monitoring unit 71 determines whether sound skipping has been detected as in the processing in S101 in FIG. 3 (S201). When it is determined that sound skipping has been detected (S201: Yes), the output control unit 72 performs mute processing on discontinuous points of a start position of a loss section (a sound skipping section) in which the sound skipping has been detected (S202).

Thereafter, the output control unit 72 determines whether the sound skipping section has ended as in the processing in S103 in FIG. 3 (S203). When it is determined that the sound skipping section has ended (S203: Yes), the output control unit 72 determines whether a mute section has ended (S204). When it is not determined that the mute section has ended (S204: No), the flow in FIG. 5 returns to the processing in S203.

On the other hand, when it is determined that the mute section has ended (S204: Yes), the output control unit 72 performs unmute processing on discontinuous point in an end position of the last sound skipping section included in the mute section (S205). Thereafter, the flow in FIG. 5 returns to the processing in S201.

As explained above, when the next sound skipping section is detected in a period from an end position of the detected sound skipping section until the mute section ends, the information processing device 1 according to the second embodiment also sets a sound skipping section detected anew as a target of the series of output control processing. Note that, although FIG. 4 illustrates a case in which a series of output control is performed on two sound skipping sections, the information processing device 1 also sets, as targets of the series of output control processing, three or more plurality of times of sound skipping sections if the sound skipping sections are sound skipping sections included in the mute section. Consequently, since the number of discontinuous points can be reduced, it is possible to suppress deterioration in reproduction quality due to a data loss during transmission.

The output control according to the second embodiment does not include fade processing in which calculation cost is generally higher than calculation cost of the mute processing. Therefore, with the information processing device 1 according to the second embodiment, it is possible to reduce calculation cost relating to the output control processing in addition to the effects obtained in the first embodiment. The reduction in the calculation cost contributes to reduction in the size and the number of loaded circuit components and power consumption.

3. Third Embodiment

In the second embodiment, the information processing device 1 is illustrated that performs a series of mute processing (output control processing) on a plurality of times of sound skipping sections that continuously occur. However, the present disclosure is not limited to this. The information processing device 1 can also perform a series of fade processing (output control processing) on a plurality of times of sound skipping sections that continuously occur like the output control processing in the first embodiment.

Note that the information processing device 1 according to the third embodiment has the same configuration as the configuration of the information processing device 1 according to the first embodiment and the second embodiment explained with reference to FIG. 1.

[3-1. Overview of Processing According to the Third Embodiment]

Figure 6:
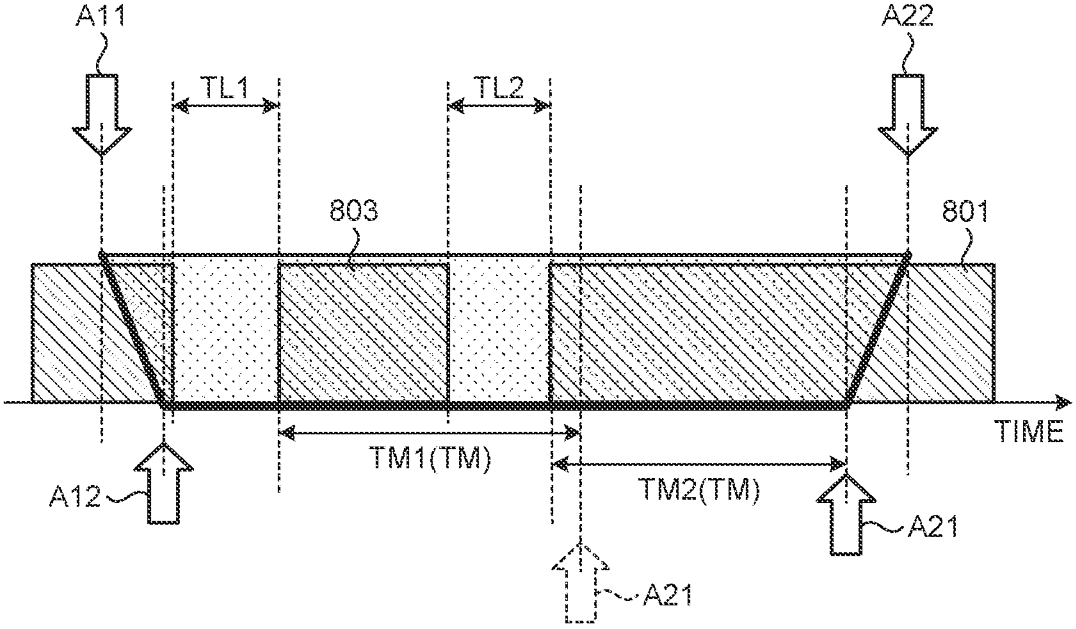
FIG. 6 is a diagram illustrating an overview of processing according to a third embodiment of the present disclosure.

FIG. 6 is a diagram illustrating an overview of processing according to the third embodiment of the present disclosure.

As illustrated in FIG. 6, as in the first embodiment, the output control unit 72 sets the control start position A11 and the end position A12 of the fade-out processing.

As illustrated in FIG. 6, as in the second embodiment, the output control unit 72 sets the start position A21 of the fade-in processing and the control end position A22 according to the loss section TL2 detected from the end position of the loss section TL1 until the mute section TM1 elapses. In an example illustrated in FIG. 6, the output control unit 72 sets the start position A21 (a broken line) of the fade-in processing at a point in time after the end position of the loss section TL1 by the mute section TM1 (the mute section TM). The output control unit 72 resets the start position A21 (a solid line) of the fade-in processing at a point in time after the end position of the loss section TL2 by the mute section TM2 (the mute section TM) according to detection of the loss section TL2 in the mute section TM1.

In this way, the output control unit 72 performs a series of the output control 803 (predetermined control) on the continuous loss sections TL1 and TL2 between the control start position A11 and the control end position A22.

[3-2. Procedure of the Processing According to the Third Embodiment]

Figure 7:
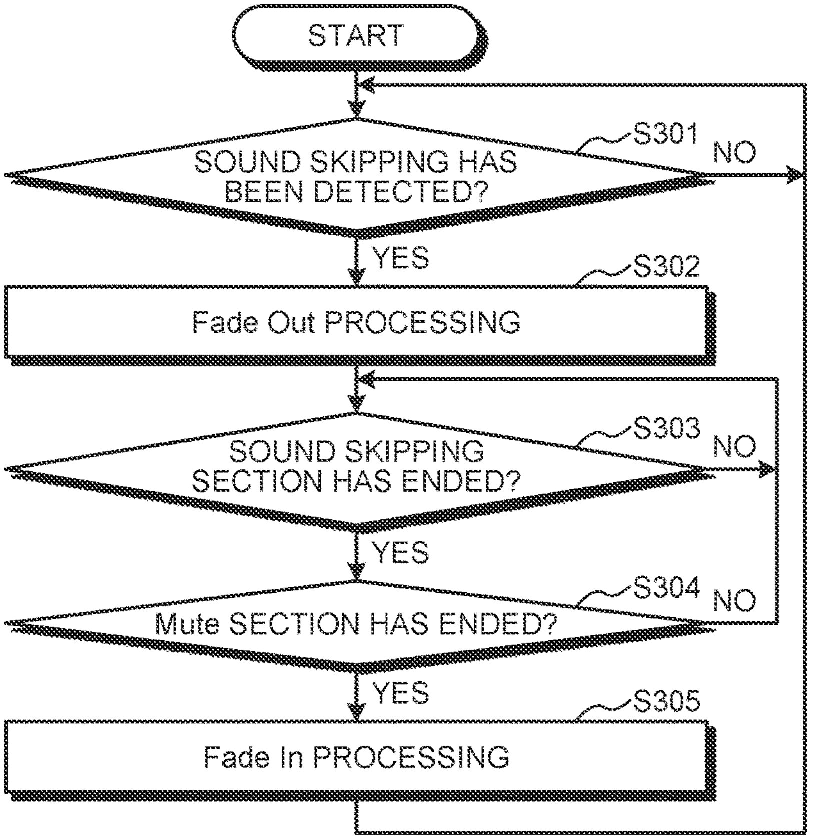
FIG. 7 is a flowchart illustrating an example of the processing according to the third embodiment of the present disclosure.

Subsequently, a procedure of the processing according to the embodiment is explained with reference to FIG. 7. FIG. 7 is a flowchart illustrating an example of processing according to the third embodiment of the present disclosure. Note that, here, differences from the flow of the processing according to the second embodiment in FIG. 5 are mainly explained.

As in the processing in S201 in FIG. 5, when it is determined that sound skipping has been detected (S301: Yes), the output control unit 72 performs fade-out processing on discontinuous points in a start position of a loss section (a sound skipping section) in which the sound skipping has been detected (S302).

Thereafter, as in the processing in S203 and S204 in FIG. 5, the output control unit 72 determines whether the sound skipping section has ended (S303) and determines whether a mute section has ended (S304). When it is determined that the mute section has ended (S304: Yes), the output control unit 72 performs fade-in processing on discontinuous points in an end position of the last sound skipping section included in the mute section (S305). Thereafter, the flow in FIG. 7 returns to the processing in S301.

As explained above, in addition to the mute processing performed in the information processing device 1 according to the second embodiment, the information processing device 1 according to the third embodiment performs the fade processing like the information processing device 1 according to the first embodiment. Consequently, it is possible to achieve mild sound skipping with more improved listening comfort than that achieved by the information processing device 1 according to the second embodiment while further reducing calculation cost than the information processing device 1 according to the first embodiment.

4. Fourth Embodiment

In the embodiments explained above, the information processing device 1 is illustrated that performs one of the fade processing and the mute processing in the output control processing. However, the present disclosure is not limited to this. In the output control processing, appropriate processing of the fade processing and the mute processing can be applied according to content of audio data.

[4-1. Configuration of an Information Processing Device According to a Fourth Embodiment]

Figure 8:
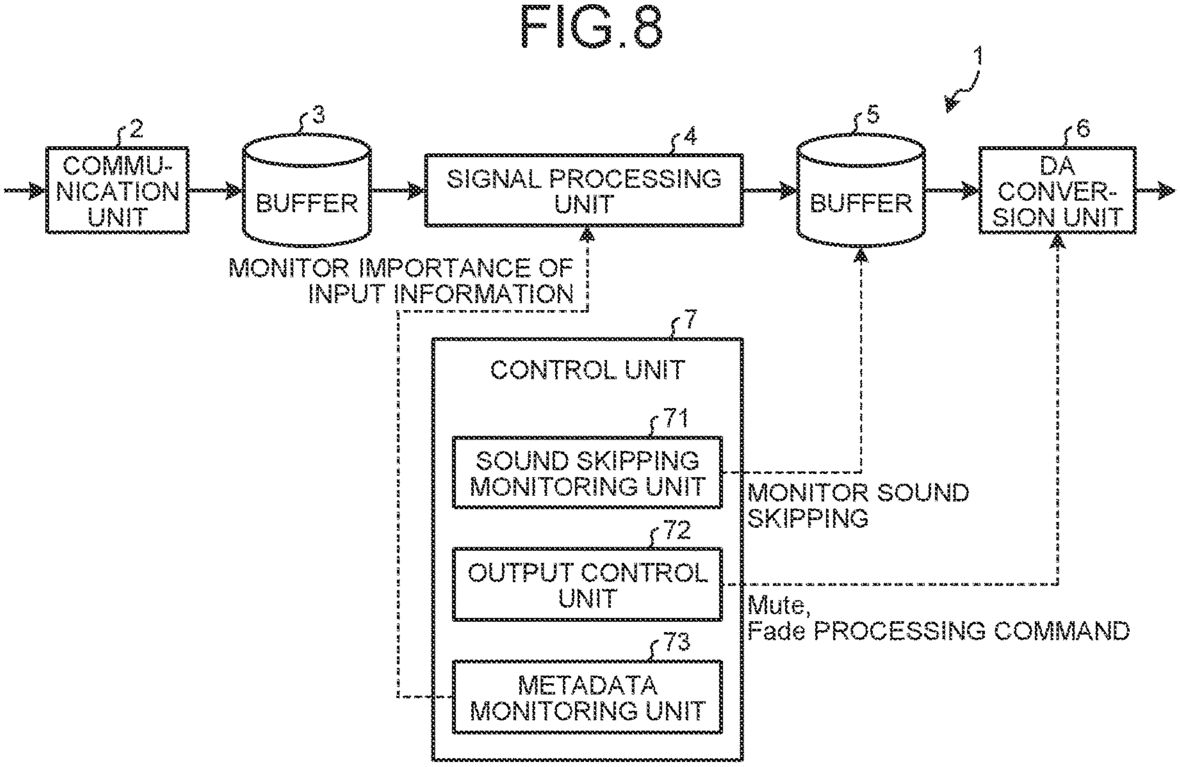
FIG. 8 is a diagram illustrating a configuration example of an information processing device according to a fourth embodiment of the present disclosure.

A configuration example of the information processing device 1 according to the fourth embodiment is explained with reference to FIG. 8. FIG. 8 is a diagram illustrating a configuration example of the information processing device 1 according to the fourth embodiment of the present disclosure. Note that, here, differences from the configuration illustrated in FIG. 1 are mainly explained.

The information processing device 1 according to the fourth embodiment acquires metadata of audio data in addition to the audio data from an external device. Further, when the audio data is decoded by the signal processing unit 4, the metadata may be imparted on the information processing device 1 side. Here, the metadata is, for example, type information of the audio data or importance information of the audio data. The type information of the audio data is, for example, information indicating whether the audio data is music data or is moving image data. The importance of the audio data is, for example, information indicating whether the audio data is a portion for a high point concerning music. The importance of the audio data is not limited to the high point and may be, for example, information indicating a part of the music. Here, the part of the music indicates, as an example, intro, A melody, B melody, a high point, or outro. The importance level of the audio data is, as an example, information indicating a music type such as classical music or Jazz. The importance of the audio data is, for example, information indicating whether a scene is a climax scene concerning a moving image. The importance of the audio data may be, for example, information indicating a part in a moving image. Here, the part in the moving image indicates, as an example, whether a line is a line of a main character. The part in the moving image indicates, as an example, whether sound is environmental sound.

Note that the importance of the audio data is assumed to be included in the metadata imparted to the audio data but is not limited to this. The importance level of the audio data may be searched and acquired by the information processing device 1 using the Internet or the like based on a type, a name, and the like of the audio data or may be imparted by storing reference data concerning the importance, for example, in a table format in advance on the information processing device 1 side and referring to the table. Here, the reference data may be stored on the Cloud side rather than in the information processing device 1. The user may set the reference data as appropriate.

The processor of the control unit 7 loads the program stored in the ROM to the RAM and executes the loaded program (application) to thereby further implement the metadata monitoring unit 73. Here, the metadata monitoring unit 73 is an example of an adjustment unit.

The metadata monitoring unit 73 acquires the type and the importance of the audio data from the signal processing unit 4. The metadata monitoring unit 73 determines content of the output control 803 for a target loss section (sound skipping section) based on the acquired type and the acquired importance of the audio data. The metadata monitoring unit 73 supplies the determined content of the output control 803 to the output control unit 72.

The output control unit 72 performs output control processing according to the content of the output control 803 supplied from the metadata monitoring unit 73. Note that, here, it is assumed that the type and the importance of the audio data are acquired from the signal processing unit 4. However, the type and the importance of the audio data may be acquired from a server, a Cloud, or the like present on the outside of the information processing device 1.

[4-2. Overview of Processing According to the Fourth Embodiment]

Figure 9:
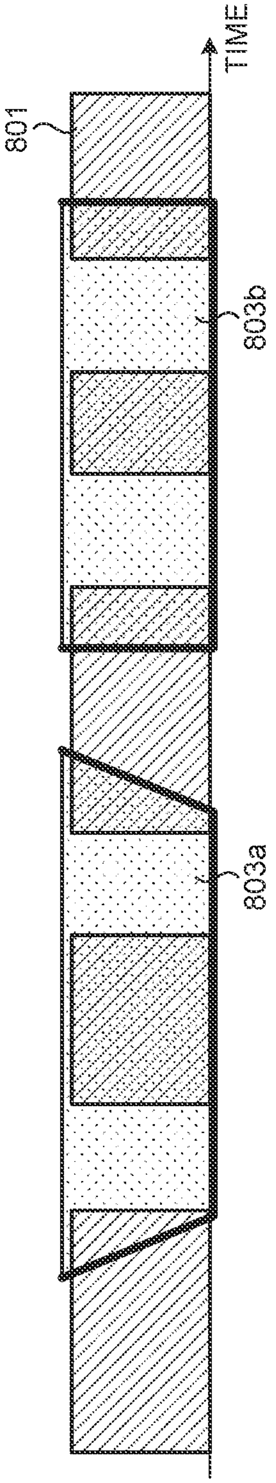
FIG. 9 is a diagram illustrating an overview of processing according to a fourth embodiment of the present disclosure.

FIG. 9 is a diagram illustrating an overview of processing according to the fourth embodiment of the present disclosure. FIG. 9 illustrates a case in which output control 803*a* to which fade processing is applied and output control 803*b* to which mute processing is applied are executed. As explained above, the metadata monitoring unit 73 determines the content of the output control 803 for the target loss section (sound skipping section) based on the acquired metadata of the audio data.

It is assumed that which processing is applied to which metadata (for example, the type and the importance) can be optionally set by the user and is determined in advance and stored in, for example, the memory of the control unit 7. As an example, the metadata monitoring unit 73 determines to apply the fade processing to music and apply the mute processing to lines. In this case, it is possible to implement output control processing for reducing a loss of an information amount for the line while improving reproduction quality for the music.

[4-3. Procedure of the Processing According to the Fourth Embodiment]

Figure 10:
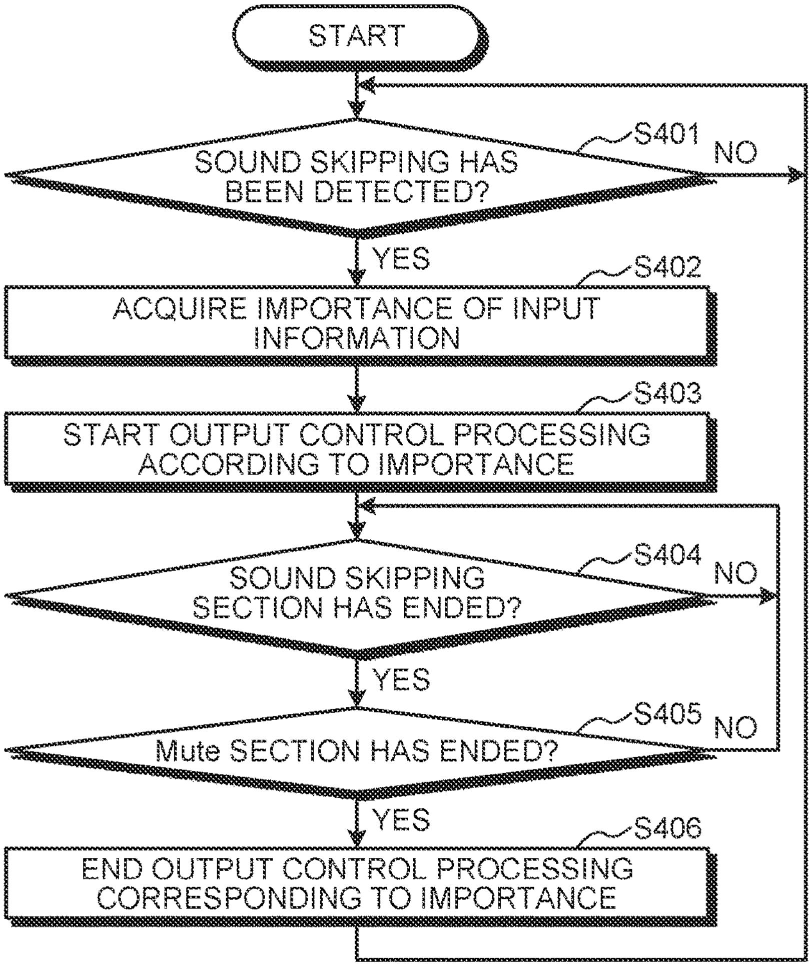
FIG. 10 is a flowchart illustrating an example of the processing according to the fourth embodiment of the present disclosure.

Subsequently, a procedure of the processing according to the embodiment is explained with reference to FIG. 10. FIG. 10 is a flowchart illustrating an example of processing according to the fourth embodiment of the present disclosure. Note that, here, differences from the flow of the processing according to the second embodiment illustrated in FIG. 5 or the processing according to the third embodiment illustrated in in FIG. 7 are mainly explained.

As in the processing in S201 in FIGS. 5 and S301 in FIG. 7, when it is determined that sound skipping has been detected (S401: Yes), the metadata monitoring unit 73 acquires a type and importance of the audio data from the signal processing unit 4. The metadata monitoring unit 73 determines content of output control for a target loss section (sound skipping section) based on the acquired type and the acquired importance of the audio data. The metadata monitoring unit 73 supplies the determined content of the output control to the output control unit 72 (S402).

Thereafter, the output control unit 72 performs output control processing according to the content of the output control supplied from the metadata monitoring unit 73 (S403). The processing in S403 is similar to the processing in S202 in FIG. 5 when the mute processing is applied. The processing in S403 is similar to the processing of S302 in FIG. 7 when the fade processing is performed.

Thereafter, as in the processing in S203 and S204 in FIGS. 5 and S303 and S304 in FIG. 7, the output control unit 72 determines whether the sound skipping section has ended (S404) and determines whether the mute section has ended (S405). When it is determined that the mute section has ended (S405: Yes), the output control unit 72 performs the output control processing on discontinuous points in an end position of the last sound skipping section included in the mute section according to the content of the output control supplied from the metadata monitoring unit 73 (S406). Thereafter, the flow of FIG. 10 returns to the processing in S401.

[4-4. Modifications of the Fourth Embodiment]

Note that, in the fourth embodiment, the information processing device 1 is illustrated that determines the content of the output control 803 for the target loss section (sound skipping section) based on the metadata of the audio data. However, the present disclosure is not limited to this. The metadata monitoring unit 73 can determine changing speed (an inclination angle) of a signal level in the fade processing based on the metadata of the audio data. At this time, changing speed in the fade-out processing and changing speed in the fade-in processing may be the same or may be different. Here, it is assumed that which changing speed is applied to which metadata can be optionally set by the user and is determined in advance and stored in, for example, the memory of the control unit 7. As an example, when the importance of the audio data is information indicating a musical, the metadata monitoring unit 73 sets large changing speed for lines from the viewpoint of reducing a loss of an information amount. As an example, when the importance of the audio data is music, the metadata monitoring unit 73 sets small changing speed from the viewpoint of reproduction quality.

Note that, when the content of the output control 803 determined based on the metadata of the audio data is mute processing, it is also likely that only one sound skipping section is detected. Therefore, even when the mute processing is performed in the processing in S402, the output control unit 72 can also perform the fade-in processing in the processing in S406 when only one sound skipping section is detected.

As explained above, the information processing device 1 according to the fourth embodiment determines the content of the output control 803 for the target loss section (sound skipping section) based on the type and the importance of the audio data. Consequently, in addition to the effects obtained in the embodiments explained above, it is possible to realize appropriate control corresponding to data to be reproduced.

5. Fifth Embodiment

In the embodiments explained above, a case is illustrated in which the audio data is continuously transmitted from the external device to the information processing device 1 even while the output control processing is performed. However, the information processing device 1 is not limited thereto. Even if a sound skipping section (a loss section) is present, deterioration in reproduction quality can be suppressed by the output control processing. Therefore, lost audio data is not used. Therefore, in the present embodiment, the information processing device 1 that performs communication optimization processing together with the output control processing is explained.

[5-1. Configuration of an Information Processing Device According to a Fifth Embodiment]

Figure 11:
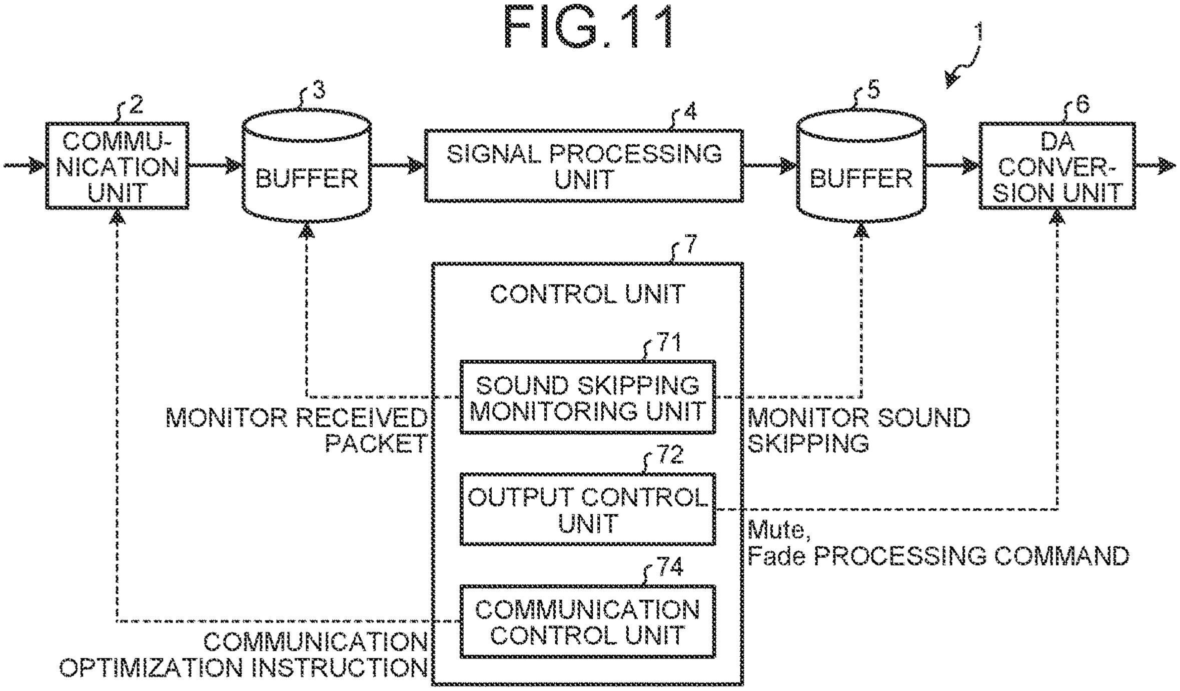
FIG. 11 is a diagram illustrating a configuration example of an information processing device according to a fifth embodiment of the present disclosure.

A configuration example of the information processing device 1 according to the fifth embodiment is explained with reference to FIG. 11. FIG. 11 is a diagram illustrating the configuration example of the information processing device 1 according to the fifth embodiment of the present disclosure. Note that, here, differences from the configuration illustrated in FIG. 1 are mainly explained.

In the information processing device 1 according to the fifth embodiment, the sound skipping monitoring unit 71 refers to audio data output from the communication unit 2 stored in the buffer 3 and further performs received packet monitoring processing for monitoring presence or absence of sound skipping due to a loss of the audio data (a packet loss).

The processor of the control unit 7 loads a program stored in the ROM to the RAM and executes the loaded program (application) to thereby further implement the communication control unit 74. Here, the communication control unit 74 is an example of the control execution unit.

The communication control unit 74 sets a communication optimization section (a third period). The communication control unit 74 executes communication optimization processing for controlling retransmission of lost audio data not to be performed in the communication optimization section.

[5-2. Overview of Processing According to the Fifth Embodiment]

Figure 12:
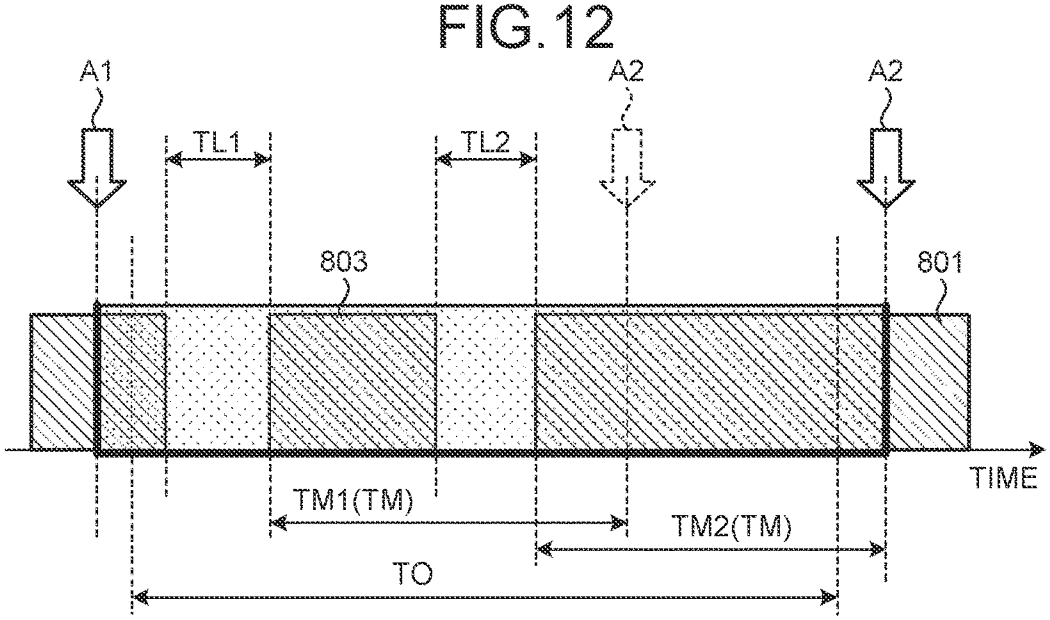
FIG. 12 is a diagram illustrating an overview of processing according to the fifth embodiment of the present disclosure.

FIG. 12 is a diagram illustrating an overview of processing according to the fifth embodiment of the present disclosure. The communication control unit 74 acquires the control start position A1 and the control end position A2 set from the output control unit 72. As illustrated in FIG. 12, the communication control unit 74 sets a shorter communication optimization section TO (the third period) between the control start position A1 and the control end position A2. The communication control unit 74 executes communication optimization processing for controlling retransmission of audio data relating to the communication optimization section TO not to be performed.

For example, a transmission scheme for, when a loss of audio data is detected in the information processing device 1, transmitting a retransmission request for the audio data in a section of the loss from the information processing device 1 to an external device is sometimes used. In this case, the communication control unit 74 does not transmit the retransmission request for the audio data to the external device concerning the set communication optimization section TO even if the audio data is lost.

For example, a transmission scheme for, in preparation for a case in which the audio data is lost, irrespective of the retransmission request from the information processing device 1, transmitting the audio data in the same section from the external device to the information processing device 1 a plurality of times is sometimes used. In this case, the communication control unit 74 transmits a request for stopping the remaining number of times of transmission to the external device concerning the communication optimization section TO.

Note that the communication control unit 74 may transmit to the external device, according to the length of the optimization section TO, indication that data from the present point in time to a predetermined time ahead is unnecessary. In this case, it is assumed that, for example, the predetermined time is determined in advance and stored in, for example, the memory of the control unit 7. Note that, as in the information processing device according to the fourth embodiment, the predetermined time may be determined based on, for example, metadata (for example, a type or importance) of audio data or the user may be able to set the predetermined time as appropriate.

[5-3. Procedure of the Processing According to the Fifth Embodiment]

Figure 13:
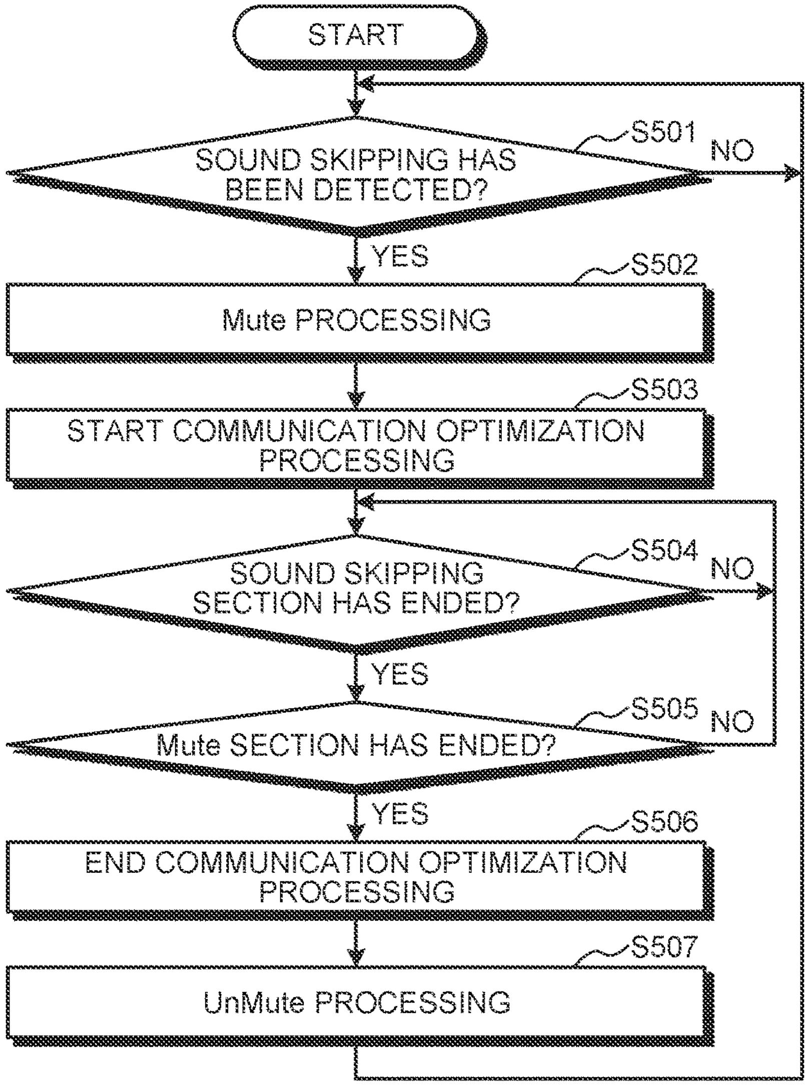
FIG. 13 is a flowchart illustrating an example of the processing according to the fifth embodiment of the present disclosure.

Subsequently, a procedure of the processing according to the embodiment is explained with reference to FIG. 13. FIG. 13 is a flowchart illustrating an example of the processing according to the fifth embodiment of the present disclosure. Note that, here, differences from the flow of the processing according to the second embodiment in FIG. 5 are mainly explained.

As in the processing in S201 in FIG. 5, when it is determined that sound skipping has been detected (S501: Yes), the output control unit 72 performs mute processing in the same manner as the processing in S202 in FIG. 5 (S502).

Thereafter, the communication control unit 74 starts communication optimization processing (S503). In addition, as in the processing in S203 and S204 in FIG. 5, the output control unit 72 determines whether the sound skipping section has ended (S504) and determines whether the mute section has ended (S505). When it is determined that the mute section has ended (S505: Yes), the communication control unit 74 ends the communication optimization processing (S506). Thereafter, the output control unit 72 performs unmute processing as in S205 in FIG. 5 (S406). Thereafter, the flow of FIG. 13 returns to the processing in S501.

As described above, the information processing device 1 according to the fifth embodiment performs the communication optimization processing for not retransmitting the lost audio data in the output control for the target loss section (sound skipping section). Consequently, in addition to the effects obtained in the embodiments explained above, it is possible to suppress deterioration in data transfer efficiency involved in the retransmission. Note that the technique according to the fifth embodiment can be optionally combined with the techniques according to the embodiments explained above.

6. Sixth Embodiment

In the information processing device 1 according to the embodiments explained above, processing (PLC: Packet Loss Concealment) of interpolating, for a sound skipping section, audio data in a loss section from audio data before and after the sound skipping section may be executed.

Note that the information processing device 1 according to a sixth embodiment has the same configuration as the configuration of the information processing device 1 according to the fifth embodiment explained with reference to FIG. 11.

In the information processing device 1 according to the sixth embodiment, when a loss of audio data (packet) is detected by the received packet monitoring processing of the sound skipping monitoring unit 71, the output control unit 72 performs, with the signal processing unit 4, the PLC on a section of the loss (a sound skipping section). Here, it is assumed that a section width for performing the PLC is determined in advance and stored in, for example, the memory of the control unit 7. The output control unit 72 performs output control processing on a section that has not been completely interpolated by the PLC in the loss section.

[6-1. Overview of Processing According to the Sixth Embodiment]

Figure 14:
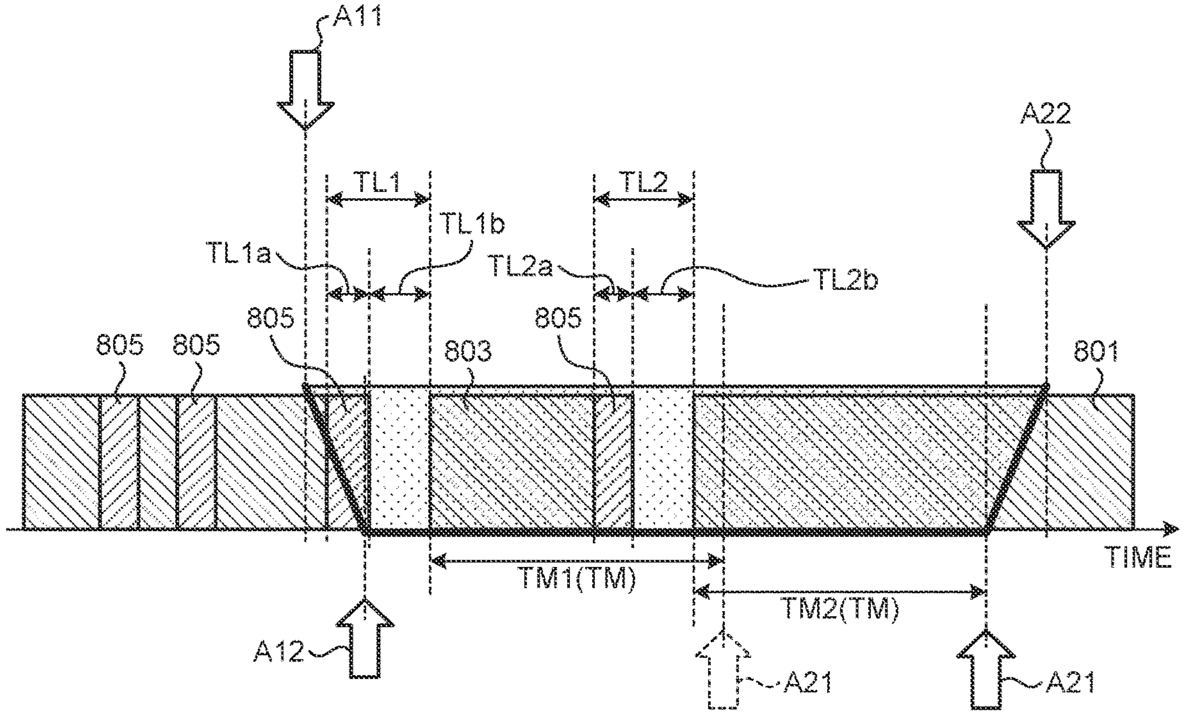
FIG. 14 is a diagram illustrating an overview of processing according to a sixth embodiment of the present disclosure.

FIG. 14 is a diagram illustrating an overview of processing according to the sixth embodiment of the present disclosure. In an example illustrated in FIG. 14, a region hatched by right upward oblique lines indicates an input signal 805 (audio data) interpolated by the PLC. In the example illustrated in FIG. 14, the loss section TL1 includes a section TL1*a* interpolated by the PLC and a section TL1*b* not interpolated by the PLC. Similarly, the loss section TL2 includes a section TL2*a* interpolated by the PLC and a section TL2*b* not interpolated by the PLC.

As illustrated in FIG. 14, as in the third embodiment, the output control unit 72 sets the control start position A11 and the end position A12 of the fade-out processing for the section TL1*b* that has not been completely interpolated by the PLC in the loss section TL1. Here, a start position of the section TL1*b* according to the sixth embodiment corresponds to the start position of the loss section TL1 according to the third embodiment.

As illustrated in FIG. 14, as in the third embodiment, the output control unit 72 sets the start position A21 and the control end position A22 of the fade-in processing for the section TL2*b* that has not been interpolated by the PLC in the loss section TL2.

As explained above, the output control unit 72 according to the sixth embodiment treats the sections TL1*b* and TL2*b* that cannot be interpolated by the PLC among the loss sections TL1 and TL2 in the same manner as the loss sections TL1 and TL2 according to the third embodiment and performs a series of output control 803 (predetermined control) on the continuous sections TL1*b* and TL2*b*.

[6-2. Procedure of the Processing According to the Sixth Embodiment]

Figure 15:
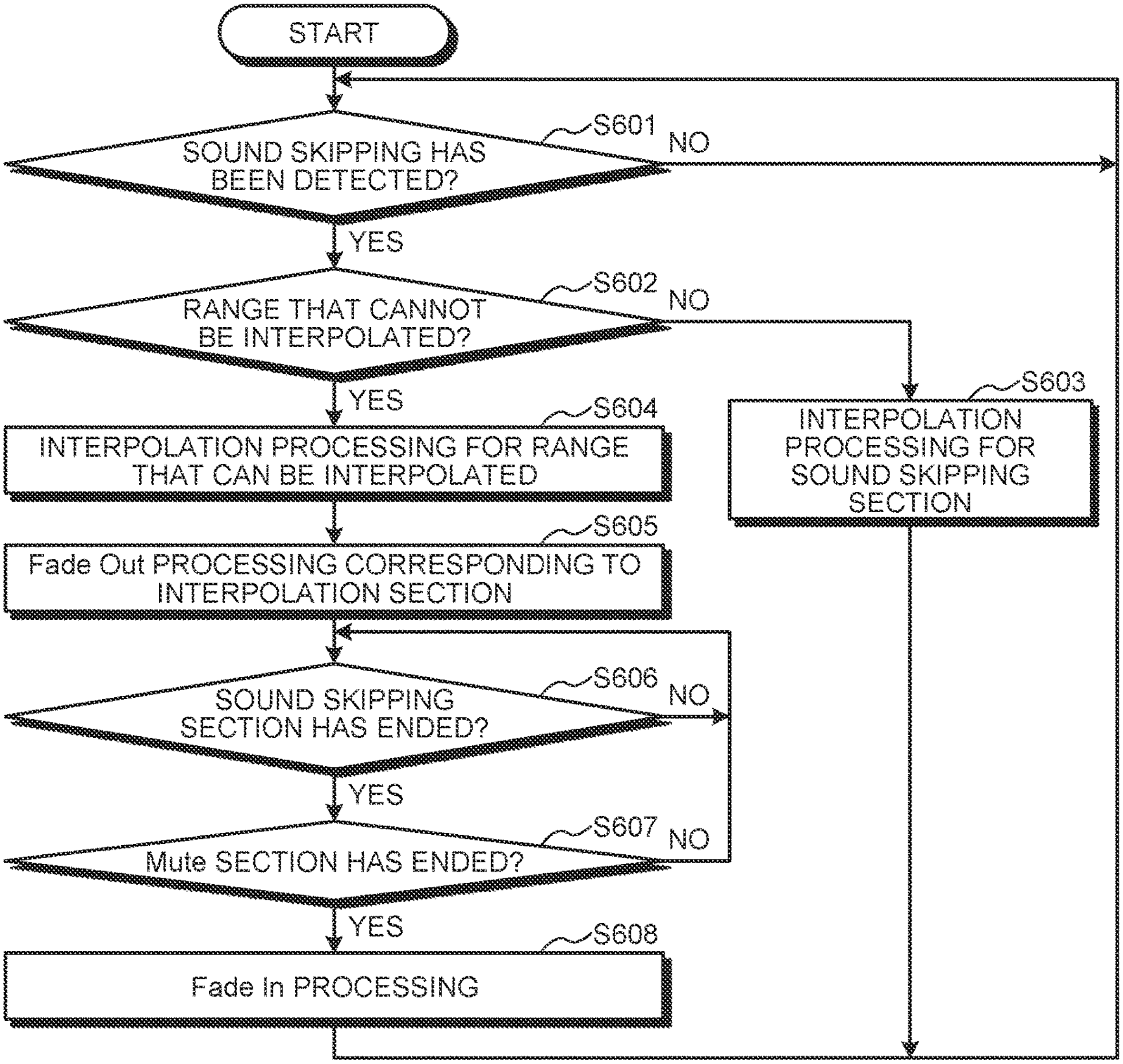
FIG. 15 is a flowchart illustrating an example of the processing according to the sixth embodiment of the present disclosure.

Subsequently, a procedure of the processing according to the embodiment is explained with reference to FIG. 15. FIG. 15 is a flowchart illustrating an example of the processing according to the sixth embodiment of the present disclosure. Note that, here, differences from the flow of the processing according to the third embodiment illustrated in FIG. 7 are mainly explained.

As in the processing in S301 in FIG. 7, when it is determined that sound skipping has been detected (S601: Yes), the output control unit 72 determines whether a target sound skipping section is in a range that cannot be interpolated (S602). When it is not determined that the target sound skipping section is in the range that cannot be interpolated (S602: No), the output control unit 72 performs PLC with the signal processing unit 4 and interpolates audio data of the sound skipping section (S603). Thereafter, the flow in FIG. 15 returns to the processing in S601.

On the other hand, when it is determined that the target sound skipping section is in the range that cannot be interpolated (S602: Yes), the output control unit 72 performs the PLC with the signal processing unit 4 and interpolates the audio data for a part of the sound skipping section, that is, the range that can be interpolated (S604). The output control unit 72 performs fade-out processing on discontinuous points in a start position of the section that has not been completely interpolated by the PLC in the loss section (the sound skipping section) in which the sound skipping has been detected (S605).

Thereafter, as in the processing in S303 and S304 in FIG. 7, the output control unit 72 determines whether the sound skipping section has ended (S606) and determines whether the mute section has ended (S607). When it is determined that the mute section has ended (S607: Yes), the output control unit 72 performs fade-in processing on discontinuous points in an end position of the last sound skipping section that has not been completely interpolated by the PLC in the sound skipping section included in the mute section (S608). Thereafter, the flow in FIG. 15 returns to the processing in S601.

As explained above, when it is determined that the sound skipping has been detected, the information processing device 1 according to the sixth embodiment interpolates the audio data with the PLC for the range that can be interpolated in the sound skipping section. Then, the information processing device 1 performs the output control processing on the range that can be interpolated in the sound skipping section as in the embodiments explained above. Consequently, the discontinuous points can be eliminated for the sound skipping section that can be interpolated by the PLC. For the sound skipping section that cannot be completely interpolated by the PLC, a silent section caused by the output control processing can be shortened. Note that the technique according to the sixth embodiment can be optionally combined with the techniques according to the embodiments explained above.

7. Other Embodiments

Note that, in the embodiments explained above, a case is illustrated in which the input signal is the audio data. However, the present disclosure is not limited to this. The output control processing according to the embodiments explained above can also be applied to light/dark processing of a light source such as an illumination device. That is, an optical signal from the light source can also be used as the input signal. In this case, it is possible to obtain an effect that deterioration in illumination quality (reproduction quality) such as visual flickering can be suppressed.

The lighting device explained above may be configured to be capable of reproducing audio data. In this case, the output control processing may not be executed concerning both of the audio data and the optical signal. The output control processing according to the embodiments explained above can be executed only for the audio data and the output of the optical signal can be performed in association with the output control for the audio data. Consequently, even when output control is further performed on the optical signal, an increase in processing cost can be suppressed.

The output control process according to the embodiments explained above may be applied to display control for an HMD (Head Mounted Display) or the like without being limitedly applied to the illumination device.

Note that, in the information processing device 1 according to the embodiments explained above, the output control processing may be performed on at least one of two discontinuous points defining a loss section. In other words, the output control processing may not be performed on one of the discontinuous points of a start position and an end position of the loss section.

8. Effects by the Information Processing Device According to the Present Disclosure The information processing device 1 includes the sound skipping monitoring unit 71 (the detection unit) and the output control unit 72 (the control execution unit). The sound skipping monitoring unit 71 detects discontinuous points where a signal level of the input signal 801 is discontinuous. The output control unit 72 performs the output control 803 (the predetermined control) on the loss section TL1 that is a section between a first discontinuous point and a second discontinuous point detected by the sound skipping monitoring unit 71. For example, an information processing method executed in the information processing device 1 includes detecting discontinuous points where a signal level of the input signal 801 is discontinuous and performing the output control 803 (the predetermined control) on the loss section TL1 that is a section between a detected first discontinuous point and a detected second discontinuous point. For example, an information processing program executed by the information processing device 1 causes a computer to detect discontinuous points where a signal level of the input signal 801 is discontinuous and perform the output control 803 (the predetermined control) on the loss section TL1 that is a section between a detected first discontinuous point and a detected second discontinuous point. Here, the output control 803 has the control start position A11 at a point in time before the first discontinuous point by a first period and has the control end position A22 at a point in time after the second discontinuous point by a second period.

As a result, the information processing device 1 can change harsh sound skipping at discontinuous points due to a loss of audio data (input signal) to mild sound skipping with improved listening comfort. In other words, with the information processing device 1, it is possible to suppress deterioration in reproduction quality due to a data loss during transmission.

In the information processing device 1, the output control 803 (the predetermined control) is at least one of fade processing and mute processing.

As a result, the information processing device 1 can suppress deterioration in reproduction quality due to a data loss during transmission.

In the information processing device 1, the output control 803 (the predetermined control) further includes non-retransmission processing (communication optimization processing) for the input signal 801.

As a result, the information processing device 1 can suppress deterioration in data transfer efficiency due to retransmission of the input signal 801 from the external device.

In the information processing device 1, the input signal 801 includes metadata. The output control 803 (the predetermined control) is at least one of fade processing and mute processing. The output control unit 72 performs at least one of the fade processing and the mute processing according to the metadata.

Consequently, the information processing device 1 can realize appropriate control according to data to be reproduced.

In the information processing device 1, the output control 803 (the predetermined control) is fade processing. The information processing device 1 further includes the metadata monitoring unit 73 (the adjustment unit) that adjusts the lengths of the first period and the second period.

Consequently, the information processing device 1 can realize, according to data to be reproduced, control corresponding to each of a viewpoint of reducing a loss of an information amount and a viewpoint of reproduction quality.

In the information processing device 1, the input signal 801 includes metadata. The metadata monitoring unit 73 (the adjustment unit) adjusts the lengths of the first period and the second period according to the metadata.

Consequently, the information processing device 1 can realize, according to data to be reproduced, control corresponding to each of a viewpoint of reducing a loss of an information amount and a viewpoint of reproduction quality.

In the information processing device 1, the metadata includes at least type information and importance information of the input signal 801.

Consequently, the information processing device 1 can realize appropriate control according to data to be reproduced.

In the information processing device 1, the output control unit 72 (the control execution unit) interpolates, based on the input signals 801 before and after the loss section TL1, the input signal 805 of the interpolation section TC that is at least a part of the loss section TL1.

As a result, the information processing device 1 can eliminate discontinuous points for a sound skipping section that can be interpolated by the PLC. In addition, for a sound skipping section that cannot be completely interpolated by the PLC, the information processing device 1 can shorten a silent section caused by the output control 803.

In the information processing device 1, the control start position A11 is an end position of the interpolation section TC.

Consequently, for a sound skipping period that cannot be completely interpolated by the PLC, the information processing device 1 can shorten the silent period caused by the output control 803.

In the information processing device 1, the input signal 801 is at least one of an audio signal and an optical signal.

As a result, when the input signal is audio data, it is possible to suppress deterioration in sound quality (reproduction quality) due to a data loss during transmission. Similarly, when the input signal is an optical signal, it is possible to obtain an effect that it is possible to suppress deterioration in illumination quality (reproduction quality) such as visual flickering due to a data loss during transmission.

In the information processing device 1, the loss section TL1 is a section in which the input signal 805 is lost in wireless transmission.

Consequently, it is possible to suppress deterioration in reproduction quality due to a data loss during the wireless transmission.

Note that the effects described in this specification are only illustrations and are not limited. Other effects may be present.

Note that the present technique can also take the following configurations.

(1)

An information processing device comprising:

a detection unit that detects discontinuous points where a signal level of an input signal is discontinuous; and a control execution unit that performs predetermined control on a loss section that is a section between a first discontinuous point and a second discontinuous point detected by the detection unit, wherein the predetermined control has a control start position at a point in time before the first discontinuous point by a first period and a control end position at a point in time after the second discontinuous point by a second period.

(2)

The information processing device according to (1), wherein the predetermined control is at least one of fade processing and mute processing.

(3)

The information processing device according to (2), wherein the predetermined control further includes non-retransmission processing of the input signal.

(4)

The information processing device according to any one of (1) to (3), wherein the input signal includes metadata, the predetermined control is at least one of fade processing and mute processing, and the control execution unit performs at least one of the fade processing and the mute processing according to the metadata.

(5)

The information processing device according to (1), wherein the predetermined control is fade processing, and the information processing device further comprises an adjustment unit that adjusts lengths of the first period and the second period.

(6)

The information processing device according to (5), wherein the input signal includes metadata, and the adjustment unit adjusts lengths of the first period and the second period according to the metadata.

(7)

The information processing device according to (4) or (6), wherein the metadata includes at least type information and importance information of the input signal.

(8)

The information processing device according to any one of (1) to (7), wherein the control execution unit interpolates, based on the input signal before and after the loss section, the input signal in an interpolation section that is at least a part of the loss section.

(9)

The information processing device according to (8), wherein the control start position is an end position of the interpolation section.

(10)

The information processing device according to any one of (1) to (9), wherein the input signal is at least one of an audio signal and an optical signal.

(11)

The information processing device according to any one of (1) to (10), wherein the loss section is a section in which the input signal is lost in wireless transmission.

(12)

An information processing method comprising:

detecting discontinuous points where a signal level of an input signal is discontinuous; and performing predetermined control on a loss section that is a section between a detected first discontinuous point and a detected second discontinuous point, wherein the predetermined control has a control start position at a point in time before the first discontinuous point by a first period and a control end position at a point in time after the second discontinuous point by a second period.

(13)

An information processing program for causing a computer to realize:

detecting discontinuous points where a signal level of an input signal is discontinuous; and performing predetermined control on a loss section that is a section between a detected first discontinuous point and a detected second discontinuous point, wherein the predetermined control has a control start position at a point in time before the first discontinuous point by a first period and a control end position at a point in time after the second discontinuous point by a second period.

REFERENCE SIGNS LIST

1 INFORMATION PROCESSING DEVICE
2 COMMUNICATION UNIT
3 BUFFER
4 SIGNAL PROCESSING UNIT
5 BUFFER
6 DA CONVERSION UNIT
7 CONTROL UNIT
71 SOUND SKIPPING MONITORING UNIT (DETECTION UNIT)
72 OUTPUT CONTROL UNIT (CONTROL EXECUTION UNIT)
73 METADATA MONITORING UNIT (ADJUSTMENT UNIT)
74 COMMUNICATION CONTROL UNIT (CONTROL EXECUTION UNIT)

The invention claimed is:

1. An information processing device, comprising:

a detection unit configured to detect discontinuous points where a signal level of an input signal is discontinuous, wherein the discontinuous points comprise at least a first discontinuous point and a second discontinuous point, the input signal comprises input data, and metadata information associated with the input data, and the metadata information indicate at least an importance level of the input data; and a control execution unit configured to perform a specific control, based on the importance level of the input data, on a loss section that is a section between the first discontinuous point and the second discontinuous point, wherein the specific control comprises a fade process, and the specific control has a control start position at a point in time before the first discontinuous point by a first period and a control end position at a point in time after the second discontinuous point by a second period.

2. The information processing device according to claim 1, wherein the specific control further comprises a mute process.

3. The information processing device according to claim 2, wherein the specific control further includes a non-retransmission process of the input signal.

4. The information processing device according to claim 2, wherein the control execution unit is further configured to the mute process, based on the metadata information.

5. The information processing device according to claim 4, wherein the metadata information further includes type information of the input signal.

6. The information processing device according to claim 1, further comprising:

an adjustment unit configured to adjust a length of the first period and a length of the second period.

7. The information processing device according to claim 6, wherein the adjustment unit is further configured to adjust the length of the first period and the length of the second period, based on the metadata information.

8. The information processing device according to claim 1, wherein the control execution unit is further configured to interpolate, based on the input signal before and after the loss section, the input signal in an interpolation section, and the interpolation section is at least a part of the loss section.

9. The information processing device according to claim 8, wherein the control start position is an end position of the interpolation section.

10. The information processing device according to claim 1, wherein the input signal is at least one of an audio signal or an optical signal.

11. The information processing device according to claim 1, wherein the loss section is a section in which the input signal is lost in wireless transmission.

12. An information processing method, comprising:

detecting discontinuous points where a signal level of an input signal is discontinuous, wherein the discontinuous points comprise at least a first discontinuous point and a second discontinuous point, the input signal comprises input data, and metadata information associated with the input data, and the metadata information indicate at least an importance level of the input data; and performing a specific control, based on the importance level of the input data, on a loss section that is a section between the detected first discontinuous point and the detected second discontinuous point, wherein the specific control comprises a fade process, and the specific control has a control start position at a point in time before the first discontinuous point by a first period and a control end position at a point in time after the second discontinuous point by a second period.

13. A non-transitory computer-readable medium having stored thereon, computer-executable instructions which, when executed by a computer, cause the computer to execute operations, the operations comprising:

detecting discontinuous points where a signal level of an input signal is discontinuous, wherein the discontinuous points comprise at least a first discontinuous point and a second discontinuous point, the input signal comprises input data, and metadata information associated with the input data, and the metadata information indicate at least an importance level of the input data; and performing a specific control, based on the importance level of the input data, on a loss section that is a section between the detected first discontinuous point and the detected second discontinuous point, wherein the specific control comprises a fade process, and the specific control has a control start position at a point in time before the first discontinuous point by a first period and a control end position at a point in time after the second discontinuous point by a second period.

* * * * *